(12) United States Patent
Kaidi (10) Patent No.: US 11,838,320 B2
(45) Date of Patent: Dec. 5, 2023

(54) PROXY SERVER AND NAVIGATION CODE INJECTION TO PREVENT MALICIOUS MESSAGING ATTACKS

(71) Applicant: PayPal, Inc., San Jose, CA (US)

(72) Inventor: George Chen Kaidi, Singapore (SG)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 17/563,388

(22) Filed: Dec. 28, 2021

(65) Prior Publication Data
US 2022/0124119 A1 Apr. 21, 2022

Related U.S. Application Data

(63) Continuation of application No. 16/399,880, filed on Apr. 30, 2019, now Pat. No. 11,252,186.

(51) Int. Cl.
*H04L 9/40* (2022.01)
*H04L 51/18* (2022.01)
*G06F 16/958* (2019.01)
*H04L 67/02* (2022.01)
*H04L 67/56* (2022.01)

(52) U.S. Cl.
CPC ........ *H04L 63/1466* (2013.01); *G06F 16/986* (2019.01); *H04L 51/18* (2013.01); *H04L 63/0281* (2013.01); *H04L 67/02* (2013.01); *H04L 67/56* (2022.05)

(58) Field of Classification Search
CPC . H04L 63/1466; H04L 51/18; H04L 63/0281; H04L 67/02; H04L 67/56; H04L 63/145; H04L 51/063; G06F 16/986
See application file for complete search history.

(56) References Cited

U.S. PATENT DOCUMENTS

| | | | |
|---|---|---|---|
| 7,890,995 B2* | 2/2011 | Shim | H04L 63/083 726/17 |
| 2012/0117458 A1* | 5/2012 | Holloway | G06F 16/95 715/234 |
| 2013/0311863 A1* | 11/2013 | Gutkin | G06F 16/9566 715/208 |
| 2017/0277807 A1 | 9/2017 | Dillon | |

* cited by examiner

*Primary Examiner* — Joe Chacko
(74) *Attorney, Agent, or Firm* — Haynes and Boone, LLP (57) ABSTRACT

There are provided systems and methods for a proxy and navigation code injection to prevent malicious messaging attacks. One or more proxy servers may reside in a perimeter network and be used to remove malicious links from messages transmitted to devices protected by the proxy server(s). The proxy server(s) may detect links to external (e.g., Internet-based) resources, such as websites and databases, and may extract data from the external resources. The proxy server(s) may generate static data that prevents processes on the external resources from being executed by devices protects by the proxy server(s). The proxy server(s) may further generate a link to the static data by adding a proxy server network address to the original link. Once the link is generated, it may be used to replace the original link to the external resource to prevent navigation to malicious data.

20 Claims, 5 Drawing Sheets

PROXY SERVER AND NAVIGATION CODE INJECTION TO PREVENT MALICIOUS MESSAGING ATTACKS

PRIORITY INFORMATION

The present application is a continuation of U.S. application Ser. No. 16/399,880 filed on Apr. 30, 2019, which is hereby incorporated by reference in its entirety.

TECHNICAL FIELD

The present application generally relates to prevention of malicious electronic messaging computing attacks, and more specifically to utilizing a proxy server in a perimeter computing network that injects proxy server navigation code to an external web link so that external data may instead be retrieved and rendered in a static secure document on the proxy server

BACKGROUND

Users may utilize computing devices, such as mobile smart phones, tablets, and desktop computers, to engage in messaging with other devices, including email, text messaging, social network messaging, and the like. Messages may include content that links computing devices to other external data with online resources, such as application and file downloads, stored database data, and websites hosted by online servers and devices that may be unknown to the computing device. Thus, the computing device receiving the message and/or the user viewing the message may be unaware of how secure these links are. For example, it is becoming increasingly common to execute certain types of computing attacks through malicious emails and links, such as phishing attacks that attempt to get users to enter secure information, exploit kits that fingerprint a machine from a website for vulnerabilities, and process exploitation attacks that hijack a machine to execute a process (e.g., cryptocurrency mining code executing in the background of webpages). Without knowing a link is secure, a computing device risks these attacks by selecting an unknown link. However, computing devices have no way to preview the link and/or determine if the link includes malicious code or routes through a malicious webpage or process on click-through.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for a proxy server and navigation code injection to prevent malicious messaging attacks. Systems suitable for practicing methods of the present disclosure are also provided.

A user may interact with an online email or messaging system and gateway, such as one provided by an organization's networked system and/or an email service provider system to send and receive electronic communications with one or more other online entities through a computing device. However, when receiving electronic communications having one or more links to other online websites, resources, or other data, as well as forwarding or otherwise sending unknown or unverified links in communications, the user may risk harm or attacks to their computing device when selecting an unknown and/or malicious link, such as phishing attacks, exploit kits, and/or background code processes that occur when the computing device is navigated to a harmful webpage or through some website. Thus, the email or messaging system may provide a process to replace a potentially harmful link with a link to static data rendered in secure fashion from the external and/or unknown online resource.

In order to provide secure electronic communications that do not have malicious links to harmful or malicious online data, websites, or other resources, one or more proxy servers may be utilized that convert online data accessible through a link in an electronic communication to static data on the proxy server(s) that prevents execution of potentially malicious processes and/or navigation through malicious online portals, websites, or resources. The proxy server may be placed within a perimeter network (also referred to herein as a "demilitarized zone" (DMZ)) used by the computing device. Generally, the DMZ exists between an outside external network, such as the Internet, and the computing device or an internal network utilized by the computing device (e.g., a network for an organization or company, such as a virtual private network (VPN), local area network (LAN), or the like that allows multiple devices to interact in a smaller, confined, or private network). This DMZ acts as a subnetwork that exposes the computing device and/or organizational network's external services to a larger and/or untrusted network (e.g., the Internet). The proxy server(s) may be provided in the DMZ so that the computing device is protected from malicious attacks on the proxy server(s). For example, the DMZ and the proxy server(s) may provide additional time to detect breach and risk to the computing device and/or the organizational network from becoming compromised because of attacks, malware, viruses, or other malicious content being executed or retrieved by the proxy server in the DMZ, thus reducing risk to the computing device and/or protecting the computing device from such malicious attacks.

In order to prevent identification of the proxy servers and/or the organization or computing device using the proxy servers, which may be used to avoid the proxy servers and/or entities utilizing the processes described herein, the organization and/or user associated with the computing device and/or internal organizational network may utilize multiple proxy servers each having different IP addresses or other network address, identifier, and/or identification process. The proxy servers may be rotated through to perform the processes described herein for external navigation link replacement and static document rendering. Each proxy server may be used and/or rotated through based on a time schedule, number of emails or other electronic messages processed by the proxy server or moving through the proxy server, the entity transmitting the electronic message through the proxy server, or other factor or preference so that the external entities and/or resources associated with transmitting the electronic message and/or having the potentially malicious content is less likely to identify the proxy server as being within the DMZ and protecting the internal network and/or computing devices.

Thus, the proxy servers are configured to receive incoming messages, emails, or other electronic communications prior to the computing device or the organizational network being exposed to the communications. The proxy servers may then identify all links within the messages. The proxy server may also identify any or all links within message or email attachments, such as .pdf or .jpeg, that may include text and/or image data including links to other documents, servers, websites/webpages, and the link. For example, a text message may be sent as an MMS message that may have additional content that includes links to other sources for data. Similarly, an email may include attachments that may have such links. These links may be visible within a message viewing application, such as Outlook®, where links may be viewed and selected within the message viewing application. Such links may similarly be processed as discussed herein.

The links may be identified by having navigational code and/or addresses to external data that is external to the network for the computing device and/or unknown by the computing device. For example, the link may include a clickthrough hyperlink that navigates the computing device to some external resource, platform, website, etc., having external data, including hypertext markup language (HTML) documents, executable computer code for computing processes (e.g., PHP or Java code running server-side on a webpage), stored database data, and/or other external data and processes accessible through the link. The proxy servers may identify all communications having any links such that all communication links may be filtered. In further embodiments, the proxy servers may also only identify communications having untrusted links or untrusted sender addresses (e.g., emails from unknown or untrusted sources, such as contained in a blacklist). In some embodiments, a domain reputation check may be performed to determine a reputation of the domain hosting the external webpage or website. An application programming interface (API) may strip particular parameters from the domain to perform the check on a higher domain level to determine trustworthiness. Additionally, a risk scoring API may also flag and/or detect suspicious users or entities transmitting the electronic communications that are intercepted and processed by the proxy server, for example, by checking past histories, blacklists, and/or malicious conduct or otherwise engaging in suspicious behavior.

In order to protect the computing device and/or other devices on the internal organizational network, the proxy server handling the particular electronic communication having one or more links may then utilize the links to retrieve the external, unsecured, and/or potentially malicious data from the online link resource. For example, the proxy server may navigate to the source for the link and retrieve the webpage data or other online data. The proxy server may implement security measures so that the proxy server is not compromised, such as security processes to detect background processes executing server-side and/or preventing downloading of malicious code, viruses, and/or malware. Additionally, the proxy server may insulate the computing device and/or network by being located in the DMZ. The proxy servers may utilize a separate range of IP addresses, or other network addresses, that are not tied to the service provider so as to insulate and hide the proxy servers from being associated with the service provider or other computing device receiving the communications.

The proxy server may then use the retrieved data to generate a static document, webpage, or other displayable interface data associated with the retrieved data. The static data may correspond to static HTML code and/or document(s) that prevent execution of external processes and/or executable code retrieved from the external resource through the link. In some embodiments, the static data may also include a screenshot or other image of the retrieved data that does not include any accessible or processible data within the image or screenshot. For example, if rendering of the HTML document fails, the proxy server may access the external resource, such as a webpage, and capture a screenshot of such data. Additionally, the proxy server may download and/or host any media files, extension data, and the like so that such data may be accessible as discussed herein. However, the data may also be parsed and/or formatted to remove any external processes that may be executed by devices and/or servers outside of the proxy server (e.g., remotely operated processes by another entity). Thus, no callbacks to another server or external source of data may be executed through the hosted data.

The proxy server may therefore strip all additional links and/or running or executable processes from the retrieved data and generate a static mirror document of the retrieved data. The links may be replaced by an expanded link that is static (e.g., does not include a hyperlink for clickthrough) and shows the source web address, as well as any navigational hops or intervening navigational destinations before reaching the source web address. For example, some malicious actors may bury a valid website through one or more hops that navigate to malicious webpages. Thus, the source address may appear valid; however, the link is still malicious and may cause harm to the computing device.

In order to provide the electronic communication to the computing device with a secure link to the static document, the proxy server may generate a link to the static document. The link may be generated by injecting or placing a navigational address, such as an IP or uniform resource code (URL) address, that navigates to the proxy server into the link to the external document. Thus, the new secure link navigates to the proxy server and specifically identifies the static document created from the potentially malicious content on the external resource. For example, the new static document may be identified using a document identifier and/or address that is the same or similar to the potentially malicious link in the electronic communication but on the proxy server or stored by the proxy server. Injection of the navigation address code may occur prior to or in front of the external link so that navigation occurs to the proxy server. A script may be set up to automatically inject this code prior to the external link in the electronic communication being received or accessed to prevent navigation to unsecured and/or malicious external resources.

The link in the email or other electronic communication is then replaced with the link to the new static document with the proxy server. The new link to the static document may also be displayed as or with the original link so that the user is aware of the online external resource that is reached through the original link. The new link may also be displayed with the full or expanded link to the external resource in hyperlink or plain text form (e.g., to prevent accidental clickthrough), or a user may left-click or hover over the link to display additional content. For example, URL shortening web services (e.g., TinyURL™) may be used to condense longer URLs into shorter URLs and may therefore obscure the destination resource that may be unknown and/or malicious. Thus, expansion of the link may allow a user to see where the link is navigating to and further identify malicious content. The expansion of the link may also display further information of the navigational hops or intermediary navigations that occur from selection of the link so that the user may view any potentially intermediary webpages or other online resources that are suspicious or malicious.

After transmitting the electronic communication to the computing device, the computing device may display the communication and the user may utilize the computing device to perform a clickthrough event or selection of the new link to the static data. In response to selection of the link, the proxy server may then render the static data. The proxy server may prevent any API or processing calls from being sent to or from the external website or online resource originally linked to through the original link by rendering the static document in place of linking to the external resource. Additionally, the proxy server may show an expanded navigation pathway to the external resource and any navigational hops or intermediary pathways, as described above. This and interface elements or data with the static document that mirrors the data from the external resource may be added. In some embodiments where a domain risk or security check is made, the static document may further display a risk score, icon designating riskiness of the link, or other identifier of the potential malicious nature of the link and source data.

Additionally, the proxy server and/or link processing operations may provide a removal process in the electronic communication that allows for removal of the link to the static document and replacement with the original link. For example, the user may be expecting a particular email with a link to a new website and may request that the website be linked to instead of the static document as the user trusts the email. Similarly, the removal process may also be provided with the static document, such as an interface element that allows the user to navigate from the static document to the external online resource. The removal process may correspond to a script that removes the injected portion of the address to the proxy server and/or static document on the proxy server so that the original external link is provided. In further embodiments, a navigation process to the online resource accessed through the link may be provided in the electronic communication and/or on the static document with the new link to the static document so that either may be selected.

In further embodiments, the proxy server and/or link processing operation may further execute a script to detect when the electronic communication is further transmitted from the computing device or other internal device on the protected network to an external device, server, or entity, such as a forwarding action of an email having a link that was mirrored using static data on the proxy server. On transmission of the electronic communication externally, the script may replace the new link to the mirrored static data, for example, by removing the injected URL prefix or other navigation code to the proxy server. The script may then provide the original link in the electronic communication in place of the new link so that the electronic communication does not include links to the proxy server for identification of the proxy server and/or use of the link processing and replacement operation.

In this manner, an electronic communication server and/or service provider may provide increased computing security for devices and networks utilizing those electronic communications. Since static data generation and hosting, as well as script processing to generate secure links to static data, is generally lightweight and does not require large amounts of computing power or storage resources, the processes may be done quickly and efficiently, thereby improving the speed by which the service provider secures incoming electronic communications and prevents threats to its and others' networks. Moreover, computing devices may be provided with detailed information of potentially malicious link navigation so that detailed choices may be made of whether to navigate to or through the links. This provides increased security to prevent unwanted and malicious attacks that can take valuable time, money, and other resources to fix.

Figure 1:
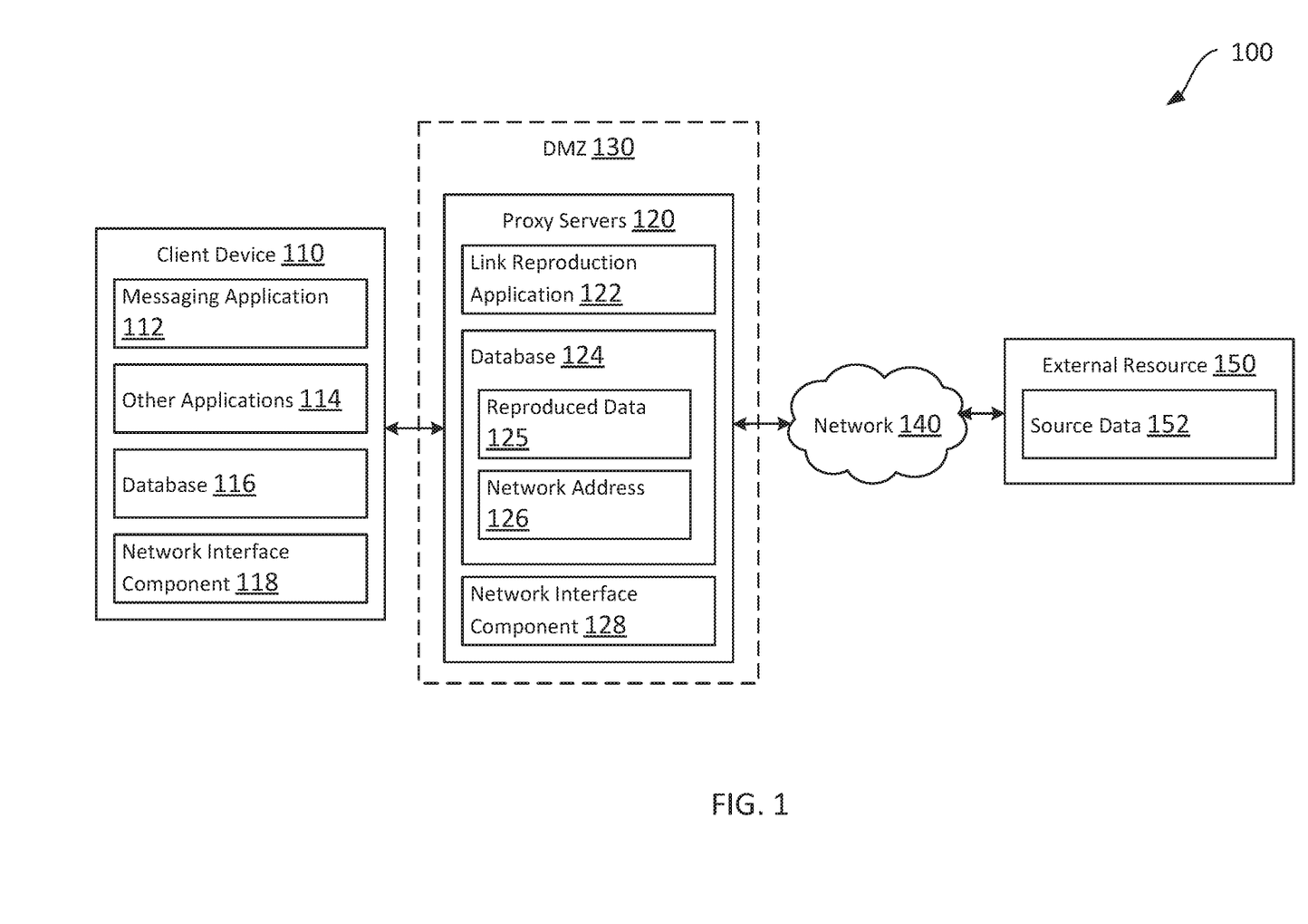
FIG. 1 is a block diagram of a networked system suitable for implementing the processes described herein, according to an embodiment.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a client device 110, proxy servers 120 in a DMZ 130, and an external resource 150 in communication over a network 140. A user (not shown) may utilize client device 110 to utilize the various features available for client device 110, which may include messaging processes, such as email, social networking, text messaging, microblogging, or other applications used to exchange text, audiovisual, or other data with other entities. External resource 150 may therefore transmit one or more messages to client device 110 over network 140 or may be linked to by a message transmitted by another entity, which may be transmitted through proxy servers 120. Proxy servers 120 may therefore process the messages to remove any links to data with external resource 150 and replace the links to mirrored static data with proxy servers 120.

Client device 110, proxy servers 120, and external resource 150 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 140.

Client device 110 may be implemented as a communication device that may utilize appropriate hardware and software configured for wired and/or wireless communications through electronic messaging, which may include personal and mobile computing devices of individual and/or groups of individuals, such as single users, companies, organizations, and/or other entities. For example, in one embodiment, client device 110 may be implemented as a personal computer (PC), telephonic device, a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

Client device 110 of FIG. 1 contains a messaging application 112, other applications 114, a database 116, and a network interface component 118. Messaging application 112 and other applications 114 may correspond to executable processes, procedures, and/or applications with associated hardware. In other embodiments, client device 110 may include additional or different modules having specialized hardware and/or software as required.

Messaging application 112 may correspond to one or more processes to execute software modules and associated devices of client device 110 to send, receive, and/or process data with external resource 150, for example, by accessing a website or other online platform of external resource 150 and request data through selection of a link to external resource 150 in a message. In this regard, messaging application 112 may correspond to specialized hardware and/or software utilized by a user of client device 110 to access external resource 150 through a hyperlink or other web or online address of external resource 150. Thus, messaging application 112 may provide one or more convenient interfaces capable of displaying messaging data that includes one or more links to external resource 150. In some embodiments, messaging application 112 may permit a user to browse information available over network 140 including accessing webpages, entering information from webpages, navigating websites through webpages, providing and receiving posts on social networking or microblogging and/or exchanging messages through websites, email servers, and/or online platforms. In certain embodiments, messaging application 112 may be implemented as a web browser configured to view information available over the Internet or access a website of a website provider. For example, messaging application 112 may be utilized to access websites and engage in online actions to receive messages having links to external resource 150. In other embodiments, messaging application 112 may be a dedicated application used for message exchange and/or posting.

Messaging application 112 may correspond to a device application, which may be utilized to perform various online and/or virtual actions, including accessing websites, messaging, electronic transaction processing, merchant shopping and purchasing, social networking, and other types of electronic actions. For example, messaging application 112 may correspond to Internet browsers (e.g., browser histories and online interactions), Internet search engines, email applications, text or instant messaging, social networking applications, microblogging applications, merchant and shopping applications, mapping applications, or other types of device applications that may be utilized to interact with external resource 150. In some embodiments, messaging application 112 may open, execute, and/or interact with another application of other applications 114 to navigate to web addresses and/or open links to external resource 150, such as a web browser application of other applications 114. Messaging application 112 may receive messages, such as emails, from proxy server 120 that replaces links to external resource 150 with links to mirrored data from external resource 150 on proxy servers 120. Thus, messaging application 112 may access the static mirrored data on proxy servers 120 through selection of a new link having injected URL or IP address data into the link to external resource 150, or may cause one of other applications 114 to access such data.

In various embodiments, client device 110 includes other applications 114 as may be desired in particular embodiments to provide features to client device 110, for example, those applications, processes, and/or features that may not be provided by messaging application 112. For example, other applications 114 may include a web browser, social networking, microblogging, or other application that may open a link and navigate to a web address, such as an address to external resource 150 and/or an address to static data on proxy servers 120. Other applications 114 may include security applications for implementing client-side security features, programmatic client applications for interfacing with appropriate application programming interfaces (APIs) over network 140, or other types of applications. Other applications 114 may include device interfaces and other display modules that may receive input from the user and/or output information to the user. For example, other applications 114 may contain software programs, executable by a processor, including a graphical user interface (GUI) configured to provide an interface to the user. Other applications 114 may therefore use components of client device 110, such as display devices capable of displaying information to users and other output devices.

Client device 110 may further include database 116 stored on a transitory and/or non-transitory memory of client device 110, which may store various applications and data and be utilized during execution of various modules of client device 110. Thus, database 116 may include, for example, identifiers such as operating system registry entries, cookies associated with messaging application 112 and/or other applications 114, identifiers associated with hardware of client device 110, or other appropriate identifiers, such as identifiers used for payment/user/device authentication or identification, which may be communicated as identifying client device 110 to external resource 150. Database 116 may include received messages, which may include links to online data and/or data with proxy servers 120, such as links to external resource 150 and/or static data with proxy servers 120.

Client device 110 includes at least one network interface component 118 adapted to communicate with proxy servers 120 and external resource 150. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Network interface component 118 may communicate directly with nearby devices using short range communications, such as Bluetooth Low Energy, LTE Direct, Wi-Fi, radio frequency, infrared, Bluetooth, and near field communications.

Proxy servers 120 may be maintained, for example, by an online messaging service provider, which may provide messaging and message processing features to users through implemented services of proxy servers 120. In this regard, proxy servers 120 includes one or more processing applications which may be configured to interact with client device 110 and/or another device/server to facilitate replacement of links in messages with links to static data generated by proxy servers 120. In one example, proxy servers 120 may be provided by PayPal®, Inc. of San Jose, CA, USA. However, in other embodiments, proxy servers 120 may be maintained by or include another type of service provider, which may provide the aforementioned services to a plurality of users. Proxy servers 120 may correspond to a plurality of proxy servers that are used such that they can be rotated through to obscure identification of proxy servers 120 and/or association with a service provider.

Proxy servers 120 of FIG. 1 includes a link reproduction application 122, a database 124, and a network interface component 128. Link reproduction application 122 may correspond to executable processes, procedures, and/or applications with associated hardware. In other embodiments, proxy servers 120 may include additional or different modules having specialized hardware and/or software as required.

Link reproduction application 122 may correspond to one or more processes to execute software modules and associated specialized hardware of proxy servers 120 to receive an electronic communication, such as an email or a text message, and remove one or more (including all) links within the communication so that the links are replaced with static data with proxy server 120 that mirrors the potentially malicious external data. In this regard, link reproduction application 122 may correspond to specialized hardware and/or software to first receive an electronic communication having a link to external resource 150, which may correspond to a hyperlink or other selectable communication element that causes client device 110 to navigate to external resource 150. Link reproduction application 122 may then determine and/or identify the links in the communication, for example, by parsing the communication to detect links to external content, resources, and/or webpages (e.g., to external resource 150). Links may be identified through detection of web addresses, hyperlinks, or other processes to navigate to external resource 150. Links may also be identified through analysis of a sender history for the communication. Additionally, link reproduction application 122 may also determine a domain risk score and/or a sender risk score for the link and/or communication, respectively, which may be used to determine if links are required to be replaced (e.g., based on trustworthiness of external resource 150 and/or a sender of the communication having the link to external resource 150).

Once the links are identified, link reproduction application 122 may retrieve content and/or data from external resource 150, for example, by navigating to external resource 150 through the link. Since proxy server 120 is within DMZ 130, proxy server 120 assists in insulating client device 110 from malicious content in the retrieved data. Once the data is retrieved, link reproduction application 122 generates static data that mirrors the external potentially malicious data. This may be done by removing all background executable processes, converting PHP, Java, etc., code to HTML code or other code that may host static data that does not require external calls to external resource 150. For example, the static data may further include .jpg, .gif, JavaScript, Cascading Style Sheets (CSS), or other data. Thus, link reproduction application 112 converts webpage or resource code to static code that does not execute processes on client device 110 (or only executes the processes in response to a request and not without user input). The static data may be generated with an identifier, such as a document name stored by proxy servers 120. To link to the static data and/or document, link reproduction application 122 may then inject URL, IP, or other address code or identifier to the static document identifier. The network address code may be injected prior to a document name or identifier of the static document or an address for the static document on proxy servers 120 so that the document may be directly linked to through the new link.

Once the new link is generated, the new link may then replace the previous link to external resource 150 so that the communication now only links to the static data with proxy servers 120 instead of the potentially malicious data with external resource 150. Link reproduction application 122 may detect a clickthrough event or other link selection application of the new link by client device 110. Link reproduction application 122 renders or populates the static document on client device 110 in place of the data or other content from external resource 150. The static document prevents any API or other external (e.g., other calls not via an API) calls being sent or received between client device 110 and external resource 150, and further prevents any processes from being executed on or by client device 110 from a request by external resource 150.

Link reproduction application 122 may further provide one or more processes to remove the new link. from the communication and/or navigate client device to external resource 150 from the communication and/or static document. For example, the communication may provide a process to remove the new link from the static document and replace the new link with the link to external resource 150. The static document may also include a process that shows the old link and/or the navigation routes of the old link so that client device 110 may navigate to external resource 150 using the old link. A script may also be used to detect if the communication with the new link(s) is sent from client device 110 to another device or entity. If so, the script may remove the injected code and/or replace the new code with the old code so that the communication again has the link to external resource 150. The processes to mirror potential malicious data and generate a code having injected address data for proxy servers 120 are discussed in further detail in reference to the exemplary methods, systems, and interfaces shown in FIGS. 2-4.

In various embodiments, proxy servers 120 may further include one or more additional applications as may be desired in particular embodiments to provide features to proxy servers 120. For example, proxy servers 120 may include security applications for implementing server-side security features, programmatic client applications for interfacing with appropriate application programming interfaces (APIs) over network 140, or other types of applications. Proxy servers 120 may contain software programs, executable by a processor, including a graphical user interface (GUI), configured to provide an interface to the user when accessing proxy servers 120, where the user or other users may interact with the GUI to more easily view and communicate information.

Additionally, proxy servers 120 may include one or more of database 124. As previously discussed, a user may establish one or more messaging accounts with proxy servers 120 and/or a messaging service provider (e.g., an email service, instant messenger, text or phone service, etc.).

Account information may be stored in database 124, which may include user information, such as name, address, birth date, messages, account information, payment instruments/funding sources, additional user financial information, user preferences, and/or other desired user data. Users may link to their respective accounts through an account, user, and/or device identifier. Thus, when an identifier is transmitted to proxy servers 120, e.g., from client device 110, one or more accounts belonging to the users may be found. Database 124 may also store message data for received messages, as well as the message content. Database 124 may be used to store reproduced data 125 from external resource 150 after retrieving data from external resource 150 and generating a static document or static data from the retrieved data. Reproduced data 125 may remove some or all executable processes and the like from the retrieved data. A network address 126 for proxy servers 120 may also be stored to database 124, such as addresses (e.g., IP or URL addresses) that may be added to a link when linking to reproduced data 125. Network address 126 uniquely identifies proxy servers 120.

In various embodiments, proxy servers 120 include at least one network interface component 128 adapted to communicate with client device 110 and external resource 150 over network 140. In various embodiments, network interface component 128 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Proxy servers 120 reside in DMZ 130, which corresponds to a perimeter network or screened subnet that exposes client device 110 to network 140. DMZ 130 can be referred to as a "demilitarized zone" that is positioned between client device 110 and network 140, such as the Internet, and allows for processes to be executed in DMZ 130 without or with less exposure to proxy servers 120. DMZ 130 therefore assists in protecting client device 110 from malicious processes. DMZ 130 allows proxy servers 120 to retrieve potentially malicious data from external resource 150 and execute the data, as well as strip the data from links and executable processes that may be malicious.

Network 140 may be implemented as a single network or a combination of multiple networks. For example, in various embodiments, network 140 may include the Internet or one or more intranets, landline networks, wireless networks, and/or other appropriate types of networks. Thus, network 140 may correspond to small scale communication networks, such as a private or local area network, or a larger scale network, such as a wide area network or the Internet, accessible by the various components of system 100.

External resource 150 may be maintained, for example, by an online entity, service provider, website hosting service, or other online resource that is accessible by devices, such as client device 110, to retrieve data and view data over network 140. In this regard, external resource 150 includes one or more processing applications which may be configured to interact with client device 110 and/or another device/server to provide data over network 140. In some embodiments, external resource 150 may be maintained by or include another type of online entity, which may provide the aforementioned data to a plurality of users.

Source data 152 may correspond to data with external resource 150 that may be served to devices, such as client device 110, over network 140. In some embodiments, source data 152 may be untrusted and/or malicious, for example, by having phishing data and process attempts, exploit kits to fingerprint client device 110 and detect exploitable weaknesses in client device 110, execute background processes when source data 152 is served and/or accessed over network 140 (e.g., background processes on a webpage or when navigating a website that executes processes without being apparent on client device 110), or other malicious process. Source data 152 may therefore be retrieved by proxy server 120 in DMZ 130 to protect client device 110 from malicious content in source data 152. Source data 152 may then be mirrored by proxy server 120, as discussed herein, so that the processes and other malicious content in source data 152 may be removed and static data corresponding to source data 152 may be hosted by proxy servers 120 for client device 110.

Figure 2:
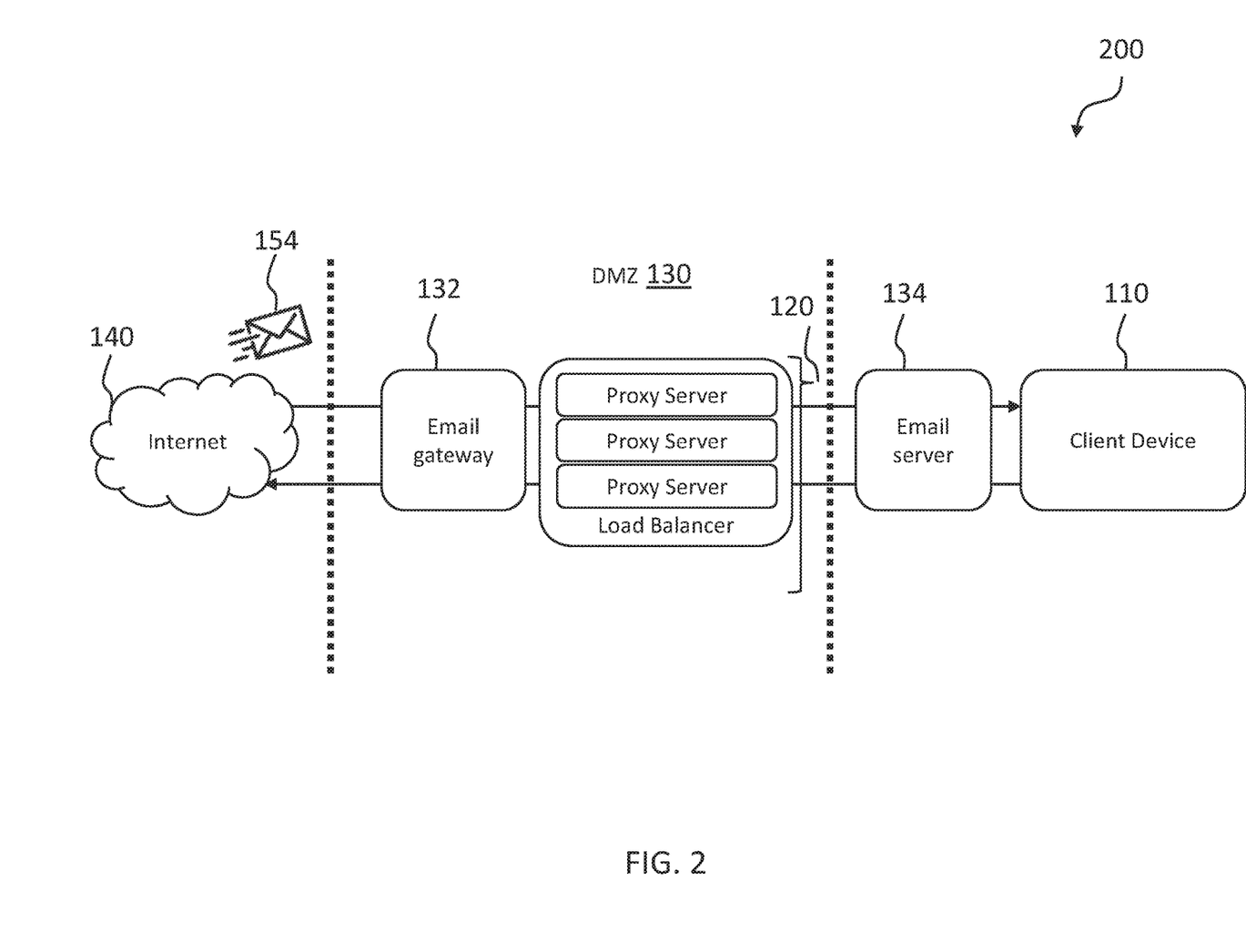
FIG. 2 is an exemplary system where a proxy server in a perimeter network may generate secure static data for external webpages when detecting links to the external webpages in messages and communications, according to an embodiment.

FIG. 2 is an exemplary system where a proxy server in a perimeter network may generate secure static data for external webpages when detecting links to the external webpages in messages and communications, according to an embodiment. System 200 of FIG. 2 includes client device 110, proxy servers 120, DMZ 130, and network 140 discussed in reference to system 100 of FIG. 1. In this regard, client device 110 may receive messages having links removed from the messages by proxy servers 120 in DMZ 130. The messages may correspond to external messages transmitted over network 140 from one or more external entities.

For example, an email 154 may be incoming to client device 110 from another device, server, or entity communicating with client device 110 over network 140. When email 154 is transmitted to client device 110, email 154 is first received by email gateway 132 for client device 110, which resides in DMZ 130. Email gateway 132 may filter incoming data so that messages are identified, including messages having links to external data or content that may be malicious. Email gateway 132 therefore identifies the incoming data from email 154 that requires processing to remove any links from email 154. Email gateway 132 may receive email 154 based on a request for email from an email server 134, which retrieves emails sent to client device 110. In other embodiments, email 154 is transmitted from the external entity and processed by email gateway 132 prior to storage with email server 134 so that the email having links replaced by proxy servers 120 may be stored with email server 134.

Email gateway 132 then provides email 154 to proxy servers 120 for processing, which includes removal of one or more (including all) links to external data and/or resources. Proxy servers 120 include multiple different servers residing in DMZ 130 so that proxy servers 120 are shielded from harming client device 110 is proxy servers 120 execute some malicious code. Thus, proxy servers 120 may utilize the links in email 154 to retrieve data from the source of the links, such as an external website or online resource that hosts data. The retrieved data may include malicious processes such that proxy servers 120 may execute or store some malicious code or process. However, since proxy servers 120 are within DMZ 130, proxy servers 120 do not affect client device 110 or provide additional protection to client device 110 so that exploits and other malicious attacks may be identified before they fully compromise client device 110. Proxy servers 120 may further include a load balance for processing load balancing of email parsing for link detection, data retrieval for data from a source of the link, and data processing/link replacement in email 154 and other messages.

Once the data is retrieved, static data, such as a document that does not include executable processes and only displays interface data that would be displayed by the source data, may be generated using the source data. The static data may be identified through an identifier that is the same or similar to the link such that when the identifier is displayed, it may appear as the link. Using the link to the external data, proxy servers 120 may further add or inject URL or IP address code, such as a URL prefix, to the link so that the new link now navigates to the static document stored by proxy servers 120 in DMZ 130. The new email 154 having the link(s) replaced by the new link(s) to the static data is then sent to email server 134 that is utilized by client device 110 to view emails and/or other messages, such as email 154 with the replaced links. Client device 110 may then view email 154 and may navigate to the static data to preview the source data in a secure matter. Additionally, email 154 and/or the static data may provide a process to navigate to the external resource and source data, as well as remove the new link from email 154 and/or the URL prefix from the old link in email 154. When email 154 is forwarded through email server 134, proxy servers 120 may further include a scripted process to remove the new links to the static data from email 154 and replace the old links in email 154.

Figure 3:
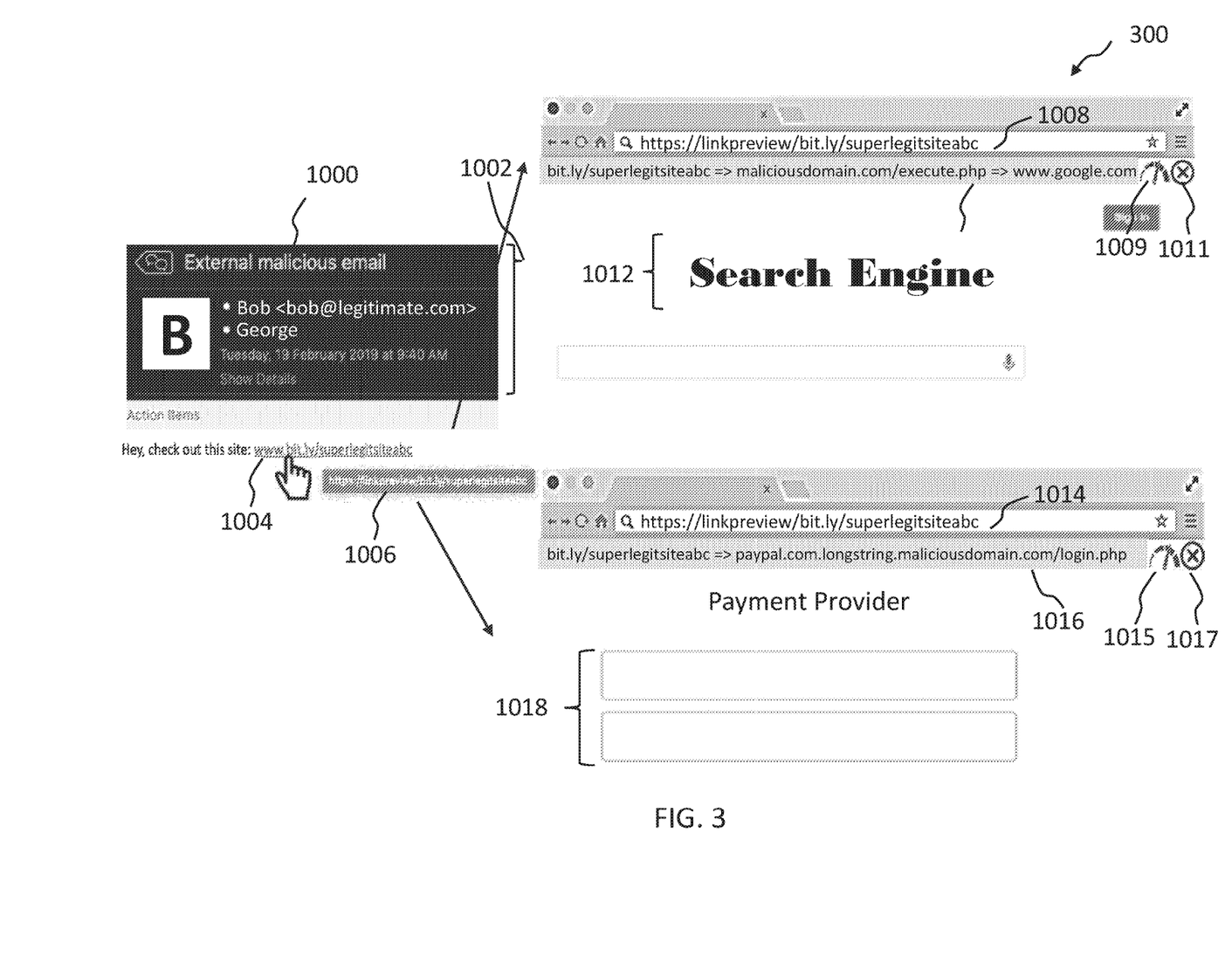
FIG. 3 are exemplary screenshots of a malicious email and secure static documents rendered from the malicious email, according to an embodiment.

FIG. 3 are exemplary screenshots of a malicious email and secure static documents rendered from the malicious email, according to an embodiment. Environment 300 of FIG. 3 includes a message 1000 having a malicious link to malicious content, data, or websites that is replaced with a link to static data with a proxy server so that a client device does not navigate to the malicious data and risk an attack or system compromise.

For example, message 1000 includes content 1002 that includes a sender of message 1000. Content 1002, such as identification data of the sender, may be used to detect that the message 1000 is potentially malicious, for example, by detecting that the sender is unknown or untrusted. In this regard, content 1002 may be used to run a threat assessment and/or domain risk score to detect the riskiness of selection of a link 1004 in message 1000. In order to determine whether, link 1004 is trusted, a proxy server may mirror data that results in navigating to the source for link 1004 in a static form so that the data does not execute any processes that may compromise a client device viewing and interacting with the data. Moreover, the proxy server may provide one or more processes for a user to determine whether a link can be trusted. For example, a link expansion process may show a full address 1006 for link 1004 so that the user can view a source address for link 1004. Full address 1006 allows for a user to view a full URL, IP address, or other network address that may be hidden in a link, for example, by using a URL shortening process. Additionally, full address 1006 may display the address to the static content on the proxy server so that the full version of link 1004 (e.g., without hiding address pieces) may be displayed with a notification that the link will navigate to the static content and is therefore safe and will not navigate to potential malicious content.

When static data is displayed by a client device on selection of link 1004 and/or full address 1006 that has been altered to link to the static data instead of the external data that may be malicious, one or more of interface 1008 and/or interface 1014 may be displayed by the client device. In this regard, interface 1008 and interface 1014 display static interface data that mirrors the potentially malicious data with the external resource. Interface 1008 includes a link expansion 1010 that includes the full hops and navigations taken when selecting the potentially malicious link for link 1004. For example, link expansion 1010 displays that a hop occurs before navigating to a secure or trusted website 1012 (e.g., www.google.com). Website 1012 therefore appears secure, however, link expansion 1010 shows that the original link would instead navigate through a malicious website that risks a computing attack or security threat. Additionally, a security icon 1009 may be displayed based on a risk assessment of the domain and/or sender that scores or rates the threat or riskiness of selection of the original link. Interface 1008 further includes a removal process 1011 that allows for closing of interface 1008 that is secure and navigation to website 1012 through the original link if the user viewing interface 1008 believes the original link is secure after viewing the data in interface 1008.

Interface 1014 incudes similar data to interface 1008 based on external data that may be malicious. For example, interface 1014 includes static interface data mirroring the potential malicious data that may include a phishing process on a malicious webpage that imitates a valid webpage. For example, link expansion 1016 shows that the original link navigates to a malicious webpage that attempts to appear as a valid webpage for a website of a "Payment Provider" where users may access an account and engage in payments. A phishing attempt 1018 attempts to get users to enter their credentials, which then may be stolen and user to hijack their account and perform an account takeover. In order to prevent users from being tricked into entering their credentials, link expansion 1016 shows that the webpage is malicious and the login for phishing attempt 1018 is fraudulent. Moreover, security icon 1009 may further display a rating that the webpage and the original link are not to be trusted and would risk compromise. A removal process 1017 is further provided to similarly close the displayed static data for interface 1014 if desired.

Figure 4:
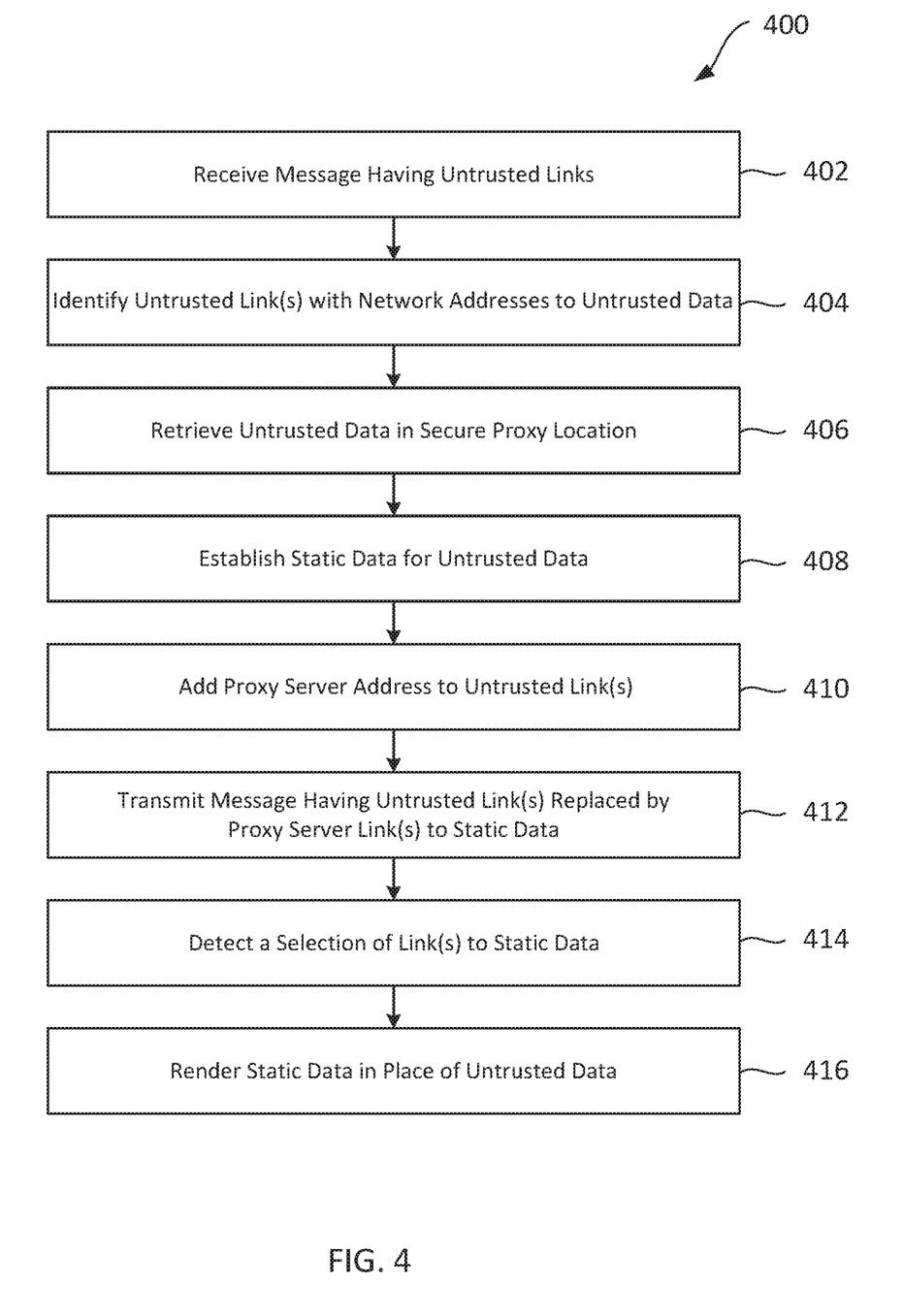
FIG. 4 is an exemplary flowchart of an exemplary process for a proxy server and navigation code injection to prevent malicious messaging attacks, according to an embodiment.

FIG. 4 is an exemplary flowchart of an exemplary process for a proxy server and navigation code injection to prevent malicious messaging attacks, according to an embodiment. Note that one or more steps, processes, and methods described herein of flowchart 400 may be omitted, performed in a different sequence, or combined as desired or appropriate.

At step 402 of flowchart 400, a message having untrusted links is received, where the untrusted links may navigate a client device to an untrusted and potentially malicious website, online data, or other online resource. The message may be identified as potentially malicious based on a sender of the message, as well as the link(s) in the message, such as links to external resources and websites that are either unknown, identified as malicious, or scored as potentially risky based on a sender risk score and/or domain analysis. A proxy server may receive the message such that the proxy server is located in a perimeter network or DMZ that protects the client device from attacks from the external resource that may result from the malicious content or data with the external resource. The proxy server may identify all messages as potentially risky based on links in the messages or may use the risk analysis to determine the message and the corresponding links are malicious.

Thus, the proxy server then identifies untrusted link(s) with network addresses to untrusted data in the message, at step 404. The untrusted links include hyperlinks or other processes that cause a client device to retrieve untrusted data from their corresponding network addresses, such as webpage navigation addresses (e.g., URLs) and/or IP addresses. These link(s) in the message may signify that the network addresses and/or data is untrusted and may compromise a client device. Therefore, the proxy server then retrieves the untrusted data in a secure proxy location, at step 406, to prevent compromising a client device that opens the message and selects the links (thereby navigating to the untrusted data). The untrusted data may correspond to retrieved source data, such as website data that would be displayed on a website when navigating to the website. Additionally, the untrusted data may include any further data and processes that accompany the data that is displayed on navigating to the website or external resource, such as background processes. Thus, the untrusted data may include HTML code and data, Javan or PHP processes, and the like that may be on a webpage. However, in other embodiments, the untrusted data may only include interface data that is displayed on navigating to the external resource through the untrusted link.

After retrieving the untrusted data, at step 408, static data for the untrusted data is established in the secure proxy location, for example, on or with the proxy servers in the DMZ or other perimeter network. The static data may correspond to an HTML document or other document and/or interface output data (e.g., for a graphical user interface (GUI)) to display the untrusted data in static form without any processes. Thus, the static data prevents any calls from being sent to or from the machine or computing device displaying the static data in place of the untrusted data. In this regard, the static data removes and/or replaces any executable processes in the untrusted data so that they will not be executed by the computing device when rendering the static data. At step 410, a proxy server address is added to the untrusted link that navigates the computing device to the static data on the proxy server or in the secure proxy location instead of navigating to the external resource that has the untrusted data. In this regard, the proxy server addresses may be added to (e.g., through a script that injects the address code) the network addresses for the untrusted links, such as a URL prefix added in front of a network address for untrusted data, although other locations/positions relative to the network address can also be used. This new address to the static data is then replaced for the links in the message.

At step 412, the message having the untrusted link(s) replaced with proxy server link(s) to static data hosted by the proxy servers are transmitted. The message may therefore link to the static data instead of potentially malicious data with the external resource. The proxy server link(s) may further include data that displays the full original untrusted link and any navigational intermediary hops that a computing device would take when selecting the untrusted link. Thus, users may be capable of viewing the full network address for an untrusted link. The proxy server or other process then detects selection of a link to static data, at step 414. This may correspond to a clickthrough event or navigation when selecting a proxy server link to static data in place of a navigation to untrusted data. In response to this selection, the static data is rendered in place of untrusted data on the client device displaying the message and performing the clickthrough navigation event, at step 416. The static data may further include processes to remove the static data and instead navigate to the untrusted data if the user deems the untrusted data that is displayed is trustworthy or safe. Additionally, the static data may be displayed with a ranking of the sender and/or domain of the untrusted link and/or data so that a user may determine whether the data may be trusted.

Figure 5:
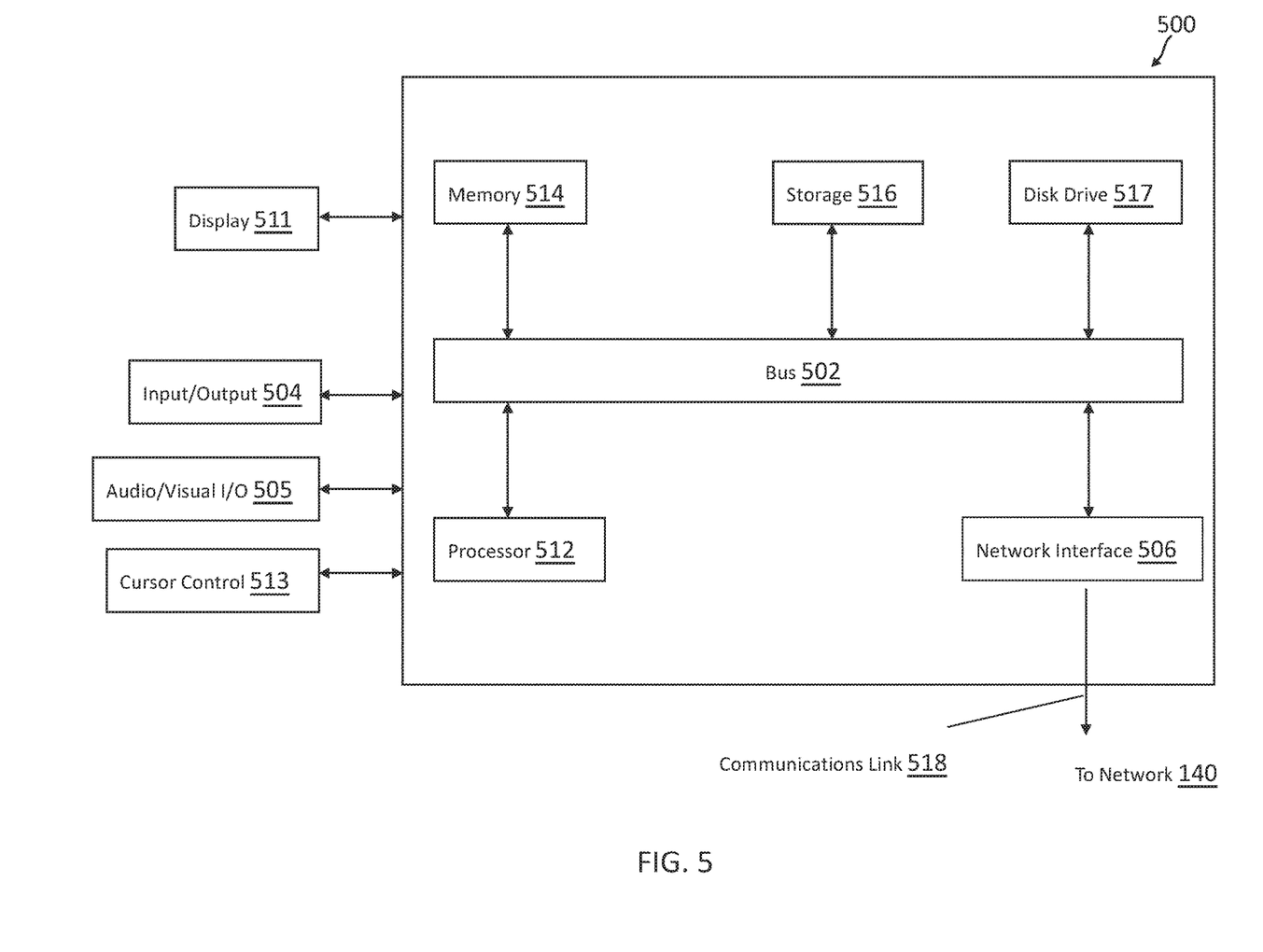
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 140. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed:

1. A method comprising:
    receiving, by a proxy server, an incoming electronic communication;
    identifying a link within the incoming electronic communication;
    analyzing a domain associated with the link, wherein the analyzing includes a domain reputation check of the domain;
    implementing a security measure at the proxy server that protects an internal system designated for receipt of the incoming electronic communication from malicious or potentially malicious communications, wherein the security measure is based in part on the domain analyzed;
    converting, based on the security measure, dynamic data accessible via the link to static data available on the proxy server; and
    reproducing, at the internal system, the link with a mirrored link that enables link processing of the static data in place of the dynamic data.

2. The method of claim 1, wherein the analyzing further includes replacing the link with an expanded static link, and wherein the expanded static link shows intervening navigational destinations.

3. The method of claim 1, wherein the link identified includes an address to data on an external network.

4. The method of claim 1, wherein the domain reputation check includes determining a risk score.

5. The method of claim 1, wherein the domain reputation check includes determining if malicious conduct or blacklisting is linked to an entity associated with the incoming electronic communication.

6. The method of claim 1, wherein, in performing the domain reputation check, particular parameters from the domain are stripped.

7. The method of claim 1, wherein the security measure includes insulating a network the proxy server is located in, and wherein the proxy server is located in a perimeter network between an outside external network and an internal network utilized computing device designated for receipt of the incoming electronic communication.

8. The method of claim 7, wherein the insulating further includes utilizing a separate range of IP addresses from a service provider system.

9. The method of claim 1, wherein the reproduced link includes data from an external resource associated with the link and stored in a separate database.

10. A non-transitory machine-readable medium having stored thereon machine-readable instructions executable to cause a machine to perform operations comprising:
    receiving, by a proxy server, an incoming electronic communication;
    identifying a link within the incoming electronic communication;
    analyzing a domain associated with the link, wherein the analyzing includes a domain reputation check on the domain;
    implementing a security measure at the proxy server that protects an internal system designated for receipt of the incoming electronic communication from malicious or potentially malicious communications, wherein the security measure is based in part on the domain analyzed;
    converting, based on the security measure, dynamic data accessible via the link to static data available on the proxy server; and
    reproducing, at the internal system, the link with a mirrored link that enables link processing of the static data in place of the dynamic data.

11. The non-transitory machine-readable medium of claim 10, wherein the analyzing further includes replacing the link with an expanded static link, and wherein the expanded static link shows intervening navigational destinations.

12. The non-transitory machine-readable medium of claim 10, wherein the link identified includes an address to data on an external network.

13. The non-transitory machine-readable medium of claim 10, wherein the domain reputation check includes determining a risk score.

14. The non-transitory machine-readable medium of claim 10, wherein the domain reputation check includes determining if malicious conduct or blacklisting is linked to an entity associated with the incoming electronic communication.

15. The non-transitory machine-readable medium of claim 10, wherein, in performing the domain reputation check, particular parameters from the domain are stripped.

16. A system comprising:
a non-transitory memory storing instructions; and
one or more hardware processors coupled to the non-transitory memory and configured to read the instructions from the non-transitory memory to cause the system to perform operations comprising:
receiving, by a proxy server, an incoming electronic communication;
identifying a link within the incoming electronic communication;
analyzing a domain associated with the link, wherein the analyzing includes a domain reputation check of the domain;
implementing a security measure at the proxy server that protects an internal system designated for receipt of the incoming electronic communication from malicious or potentially malicious communications, to avoid wherein the security measure is based in part on the domain analyzed;
converting, based on the security measure, dynamic data accessible via the link to static data available on the proxy server; and
reproducing, at the internal system, the link with a mirrored link that enables link processing of the static data in place of the dynamic data.

17. The system of claim 16, wherein the analyzing further includes replacing the link with an expanded static link, and wherein the expanded static link shows intervening navigational destinations.

18. The system of claim 16, wherein the link identified includes an address to data on an external network.

19. The system of claim 16, wherein the domain reputation check includes determining a risk score.

20. The system of claim 16, wherein the domain reputation check includes determining if malicious conduct or blacklisting is linked to an entity associated with the incoming electronic communication.

* * * * *

UNITED STATES PATENT AND TRADEMARK OFFICE
CERTIFICATE OF CORRECTION

| | | |
|---|---|---|
| PATENT NO. | : 11,838,320 B2 | Page 1 of 1 |
| APPLICATION NO. | : 17/563388 | |
| DATED | : December 5, 2023 | |
| INVENTOR(S) | : George Chen Kaidi | |

It is certified that error appears in the above-identified patent and that said Letters Patent is hereby corrected as shown below:

In the Claims

Claim 16, Column 20, Line 1, change "to avoid wherein the security" to --wherein the security--.

Signed and Sealed this
Thirtieth Day of January, 2024

Katherine Kelly Vidal
*Director of the United States Patent and Trademark Office*